(12) United States Patent
Omaru et al.

(10) Patent No.: US 9,972,831 B2
(45) Date of Patent: May 15, 2018

(54) NEGATIVE MATERIAL FOR NONAQUEOUS ELECTROLYTE SECONDARY BATTERY AND NONAQUEOUS ELECTROLYTE SECONDARY BATTERY USING THE NEGATIVE MATERIAL

(71) Applicant: Sony Corporation, Tokyo (JP)

(72) Inventors: Atsuo Omaru, Fukushima (JP); Hiroaki Tanizaki, Miyagi (JP)

(73) Assignee: MURATA MANUFACTURING CO., LTD, Kyoto (JP)

( * ) Notice: Subject to any disclaimer, the term of this patent is extended or adjusted under 35 U.S.C. 154(b) by 181 days.

(21) Appl. No.: 15/233,331

(22) Filed: Aug. 10, 2016

(65) Prior Publication Data

US 2016/0351895 A1    Dec. 1, 2016

Related U.S. Application Data

(63) Continuation of application No. 10/297,650, filed as application No. PCT/IB02/01115 on Apr. 9, 2002, now Pat. No. 9,450,245.

(30) Foreign Application Priority Data

Apr. 9, 2001   (JP) .............................. P2001-110548
Sep. 26, 2001  (JP) .............................. P2001-294504

(51) Int. Cl.
*H01M 4/13*   (2010.01)
*H01M 4/36*   (2006.01)
(Continued)

(52) U.S. Cl.
CPC ............. *H01M 4/364* (2013.01); *H01M 4/13* (2013.01); *H01M 4/131* (2013.01); *H01M 4/133* (2013.01); *H01M 4/134* (2013.01); *H01M 4/136* (2013.01); *H01M 4/1393* (2013.01); *H01M 4/1395* (2013.01); *H01M 4/362* (2013.01);
(Continued)

(58) Field of Classification Search
CPC ........ H01M 4/583; H01M 4/13; H01M 4/133; H01M 4/1393; H01M 4/362; H01M 4/40; H01M 4/58; H01M 4/625; H01M 4/405; H01M 2004/027; H01M 10/0525
See application file for complete search history.

(56) References Cited

U.S. PATENT DOCUMENTS 5,294,498 A * 3/1994 Omaru ................. H01M 10/05
                                                        252/502
5,939,224 A * 8/1999 Bito ...................... H01M 4/583
                                                        429/220
(Continued)

FOREIGN PATENT DOCUMENTS

EP         0729194 A2      8/1996
JP         05-234583       9/1993
(Continued)

*Primary Examiner* — Jonathan Crepeau
*Assistant Examiner* — Angela Martin
(74) *Attorney, Agent, or Firm* — Dentons US LLP

(57) ABSTRACT

A nonaqueous electrolyte secondary battery comprising an anode (3), a cathode (2) and a nonaqueous electrolyte. The anode includes composite particles having a carbon material included in a metallic material. As the metallic material, a metal capable of electrochemically reacting with lithium in a nonaqueous electrolyte is included.

23 Claims, 2 Drawing Sheets

(51) Int. Cl.
| | |
|---|---|
| *H01M 4/40* | (2006.01) |
| *H01M 4/58* | (2010.01) |
| *H01M 4/62* | (2006.01) |
| *H01M 4/48* | (2010.01) |
| *H01M 10/05* | (2010.01) |
| *H01M 4/133* | (2010.01) |
| *H01M 4/1393* | (2010.01) |
| *H01M 4/583* | (2010.01) |
| *H01M 10/0525* | (2010.01) |
| *H01M 4/131* | (2010.01) |
| *H01M 4/134* | (2010.01) |
| *H01M 4/136* | (2010.01) |
| *H01M 4/1395* | (2010.01) |
| *H01M 4/485* | (2010.01) |
| *H01M 10/0568* | (2010.01) |
| *H01M 10/0569* | (2010.01) |
| *H01M 4/02* | (2006.01) |
| *H01M 4/38* | (2006.01) |

(52) U.S. Cl.
CPC ............ *H01M 4/40* (2013.01); *H01M 4/405* (2013.01); *H01M 4/485* (2013.01); *H01M 4/58* (2013.01); *H01M 4/583* (2013.01); *H01M 10/0525* (2013.01); *H01M 10/0568* (2013.01); *H01M 10/0569* (2013.01); *H01M 4/386* (2013.01); *H01M 4/625* (2013.01); *H01M 2004/027* (2013.01); *Y02E 60/122* (2013.01)

(56) References Cited

U.S. PATENT DOCUMENTS

| | | | |
|---|---|---|---|
| 5,943,389 A * | 8/1999 | Lee | H01J 35/108 378/143 |
| 6,371,995 B1 | 4/2002 | Yasunami | |
| 6,440,610 B1 | 8/2002 | Sheem et al. | |
| 6,455,202 B1 | 9/2002 | Marugan et al. | |
| 6,780,388 B2 | 8/2004 | Masuko et al. | |

FOREIGN PATENT DOCUMENTS

| | | | |
|---|---|---|---|
| JP | 08-045548 | | 2/1996 |
| JP | 08-273702 | | 10/1996 |
| JP | 10-112316 | * | 4/1998 |
| JP | 10-334889 | | 12/1998 |
| JP | 10-334899 A | | 12/1998 |
| JP | 11-016571 | | 1/1999 |
| JP | 11-031532 | | 2/1999 |
| JP | 11-135153 | | 5/1999 |
| JP | 2000-012092 | | 1/2000 |
| JP | 2000-188134 | | 7/2000 |
| JP | 2000-1888134 | * | 7/2000 |
| JP | 2000-323174 | | 11/2000 |
| JP | 2000-353545 | | 12/2000 |
| JP | 2001-052742 | | 2/2001 |
| JP | 2001-294504 | | 10/2001 |
| JP | 2001-338643 | | 12/2001 |

* cited by examiner

NEGATIVE MATERIAL FOR NONAQUEOUS ELECTROLYTE SECONDARY BATTERY AND NONAQUEOUS ELECTROLYTE SECONDARY BATTERY USING THE NEGATIVE MATERIAL

RELATED APPLICATION DATA

This application is a continuation of U.S. patent application Ser. No. 10/297,650 filed Apr. 9, 2002. U.S. patent application Ser. No. 10/297,650 is the Section 371 National Stage of PCT/IB02/01115 filed Apr. 9, 2002. The entireties of which are incorporated herein by reference to the extent permitted by law. The present application claims the benefit of priority to Japanese Patent Application Nos. JP 2001-110548 filed on Apr. 9, 2001 and JP 2001-294504 filed on Sep. 26, 2001 in the Japan Patent Office, the entireties of which are incorporated by reference herein to the extent permitted by law.

TECHNICAL FIELD

The present invention relates to a negative material including metal capable of electrochemically reacting with lithium in a nonaqueous electrolyte and a nonaqueous electrolyte secondary battery using the negative material.

BACKGROUND ART

In recent years, many portable electronic devices such as video cameras with video tape recorders, portable telephones, laptop computers, etc. have been produced and they have been made compact and light. A study and development for improving the energy density of batteries, especially, secondary batteries as the portable power sources of these electronic devices have been actively advanced. Particularly, since nonaqueous electrolyte secondary batteries such as lithium-ion secondary batteries can obtain energy density higher than those of lead-acid batteries and nickel-cadmium batteries as conventional aqueous electrolyte secondary batteries, the nonaqueous electrolyte secondary batteries are useful as the power sources of the electronic devices.

As a negative material used for such a lithium-ion secondary battery, carbonaceous materials such as non-graphitizable carbon or graphite have been widely employed, because they have a relatively high capacity and show good cyclic characteristics.

As the high capacity of the lithium-ion secondary batteries is realized, the carbonaceous materials to act as an anode further need to have higher capacity. For example, Japanese Patent Application Laid-Open No. HEI 8-315825 proposes that carbonizing materials and manufacturing conditions are selected to achieve a high capacity by the carbonaceous materials. In the above-described carbonaceous materials to act as an anode, since an anode discharging potential is 0.8 V to 1.0 V relative to lithium, battery discharging voltage when a battery is formed becomes low, so that a great improvement of the energy density of the battery is not anticipated. Further, the carbonaceous anode materials are disadvantageously large in its hysteresis in the form of a charging and discharging curve and low in its energy efficiency in each charging and discharging cycle.

As an anode having a high capacity, there have been proposed materials produced by applying a process that a certain kind of metal is electrochemically alloyed with lithium and the alloy is reversibly combined/decombined. As such materials, there may be exemplified, for instance, Li—Al alloy, etc. Further, Si alloys such as Li—Si alloy are disclosed in the specification of U.S. Pat. No. 4,950,566. A battery using the Li—Al alloy and the Li—Si alloy as negative materials exhibits disadvantages that the expansion and contraction of an anode upon charging and discharging operations are terrible, the negative material is caused to be minute every time charging and discharging cycles are repeated and cyclic characteristics are seriously bad. As one of main factors that the cyclic characteristics are deteriorated, it may be guessed that the negative materials are caused to be minute so that the electronic connection between the negative materials or the negative materials and a current collector is prevented to hardly advance charging and discharging reactions.

DISCLOSURE OF THE INVENTION

The present invention is proposed by taking the problems of the related art as described above into consideration and it is an object of the present invention to provide an anode having a high capacity and capable of realizing excellent cyclic characteristics, a nonaqueous electrolyte secondary battery using this negative material and a method for manufacturing a negative material.

In order to achieve the above-described object, an anode according to the present invention includes composite particles having a metallic material containing a carbon material, and metal capable of electrochemically reacting with lithium in a nonaqueous electrolyte as the metallic material.

Since the composite particles of the negative material include the metal capable of electrochemically reacting with lithium in the nonaqueous electrolyte as the metallic material, the anode is used for a nonaqueous electrolyte secondary battery so that the high capacity of the battery can be realized.

Since the metal capable of electrochemically reacting with lithium which forms the anode expands and contracts in accordance with electrochemical reactions, the composite particles are caused to be minute when charging and discharging operations are repeated. In the anode according to the present invention, since the carbon materials are included in the composite particles, even when the composite particles are caused to be minute, the carbon materials are provided between the particles to ensure an electronic conductivity in the composite particles.

The present invention concerns a nonaqueous electrolyte secondary battery comprising an anode, a cathode and a nonaqueous electrolyte. The anode used in the battery includes composite particles as negative active material having a metallic material containing a carbon material and metal capable of electrochemically reacting with lithium in a nonaqueous electrolyte as the metallic material.

In the nonaqueous electrolyte secondary battery according to the present invention, the anode includes the composite particles as negative active material having the metallic material containing the carbon material. Since the composite particles include the metal capable of electrochemically reacting with lithium in the nonaqueous electrolyte as the metallic material, the nonaqueous electrolyte secondary battery with a high capacity can be realized.

Since the metal capable of electrochemically reacting with lithium which forms the anode expands and contracts in accordance with electrochemical reactions, the composite particles are caused to be minute when charging and discharging operations are repeated. In the anode used in the battery according to the present invention, since the carbon materials are included in the composite particles, even when the composite particles are caused to be minute, the carbon materials are provided between the minute particles so that an electronic conductivity in the composite particles can be ensured. As a result, in the nonaqueous electrolyte secondary battery according to the present invention, even when the charging and discharging operations are repeated, the increase of internal resistance of the battery due to the deterioration of electrodes can be suppressed.

A method for manufacturing an anode according to the present invention which includes composite particles having a metallic material containing a carbon material and metal capable of electrochemically reacting with lithium in a nonaqueous electrolyte as the metallic material, comprises a step of mixing the metallic material with the carbon material and pelletizing the mixture, and at least a part of the step is carried out in a non-oxidizing atmosphere.

In the method for manufacturing an anode according to the present invention, since at least a part of the step of mixing the metallic material with the carbon material and pelletizing the mixture is carried out in the non-oxidizing atmosphere, the oxidation or combustion of the carbon material is prevented.

In the present invention, a state that the carbon material is included in the metallic material indicates a state that the carbon material is stuck to the metallic material. At this time, a part of the carbon material may be exposed from the surfaces of the composite particles or the carbon material may be completely buried in the composite particles.

Still other objects of the present invention and specific advantages obtained by the present invention will be more apparent from the description of an embodiment by referring to the accompanying drawings.

BEST MODE FOR CARRYING OUT THE INVENTION

Figure 1:
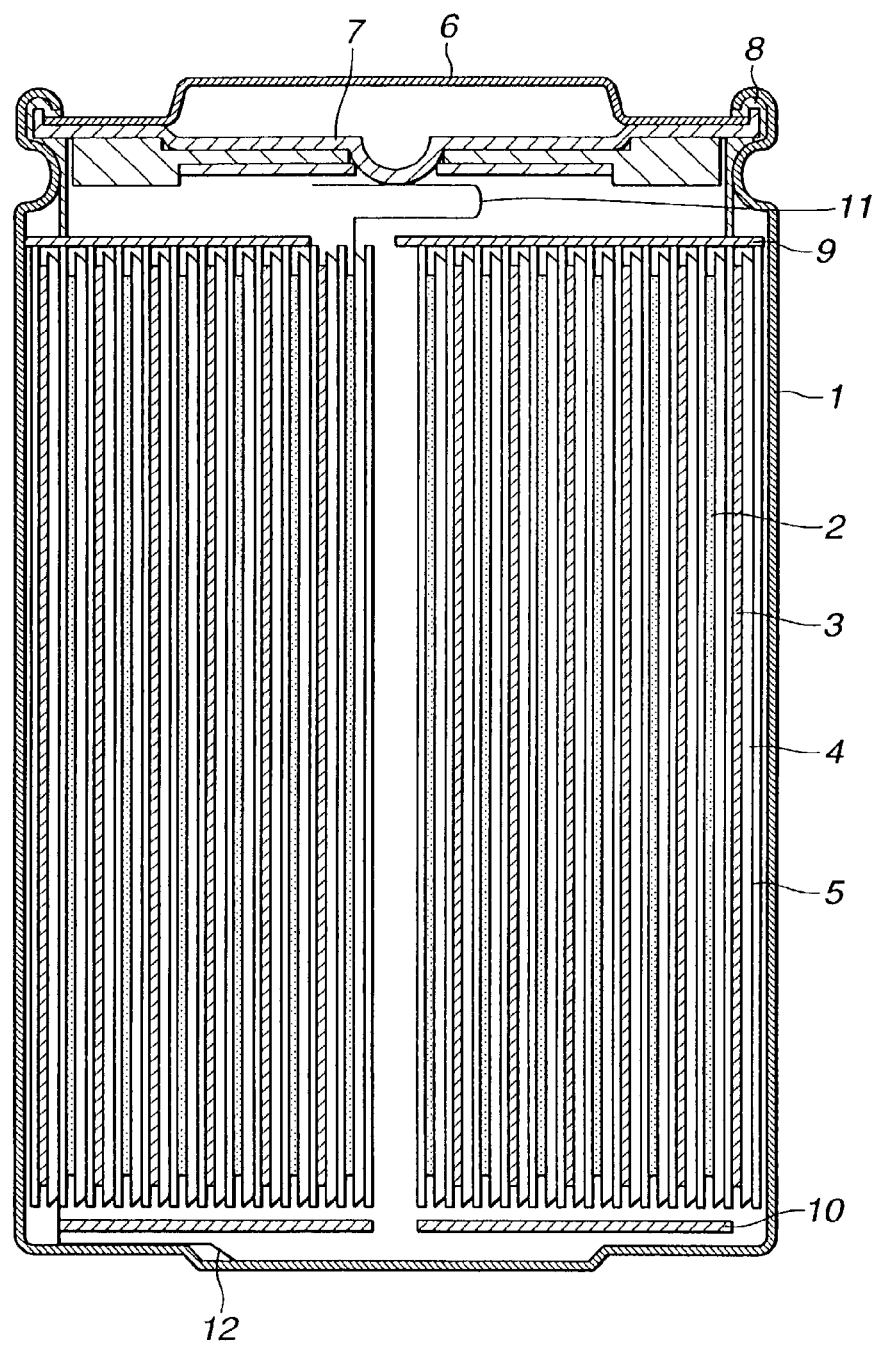
FIG. 1 is a cross sectional view showing a nonaqueous electrolyte secondary battery to which the present invention is applied.

A negative material, a nonaqueous electrolyte battery and a method for manufacturing an anode according to the present invention will be described below in detail by referring to the drawings.

A negative material according to the present invention includes composite particles having a carbon material contained in a metallic material. The metallic material includes metal capable of electrochemically reacting with lithium in a nonaqueous electrolyte. In the anode, since the composite particles include the metal capable of electrochemically reacting with lithium in a nonaqueous electrolyte (simply refer it to as "metal capable of electrochemically reacting with lithium", hereinafter), when the anode is used for a battery, it can achieve a higher capacity than that of an anode using a conventional carbonaceous material.

Since the metal capable of electrochemically reacting with lithium expands and contracts due to electrochemical reactions, the metal is caused to be minute causing a structural destruction by repeating charging and discharging operations. As a result, the electronic conductivity between the minute metals capable of electrochemically reacting with lithium is deteriorated.

According to the present invention, since the carbon materials are included in the composite particles, even when the composite particles are caused to be minute, the contained carbon materials are interposed between the minute particles. Even when the composite particles are caused to be minute by repeating the charging and discharging reactions, the anode to which the present invention is applied can maintain the electronic conductivity in the composite particles.

In the present invention, a state that the carbon materials are contained in the metallic material means a state that the carbon materials stick to the metallic material. At this time, the carbon materials may be partly exposed from the surfaces of the composite particles or completely buried in the composite particles. Where the carbon materials are merely stuck on the surfaces of the composite particles, this case is not included in the scope of the present invention. Whether or not the carbon materials are included in the metallic material is decided depending on whether the carbon materials are mixed in the composite particles or not, for instance by cutting the composite particles and observing the cut section by an analytical electron microscope.

The metal capable of reacting with lithium in the nonaqueous electrolyte indicates such metals capable of reacting with lithium in the nonaqueous electrolyte as described below.

As the specific metals capable of electrochemically reacting with lithium in the nonaqueous electrolyte, there may be exemplified metals capable of electrochemically forming alloys with lithium and alloy compounds thereof. The alloy compound herein designates a compound represented by a chemical formula $M_xM'_yLi_z$ (here, M' in the formula indicates one or more metal elements except Li and M. x is a numeric value larger than 0 and y and z are numeric values not smaller than 0.), when assuming that a certain metal element capable of forming alloy with lithium is M. In the present invention, there are also included elements such as B, Si, As, etc. as semiconductor elements. There may be specifically exemplified metals such as Mg, Al, Ga, In, Si, Ge, Sn, Pb, Sb, Bi, Cd, Ag, Zn, Hf, Zr, Y, etc. and alloy compounds thereof, Li—Al, Li—Al-M (here, M in the formula designates one or more kinds of elements selected from the 2A group, 3B group, 4B group, and transition metals.), Al Sb, CuMgSb, etc.

As the metals capable of electrochemically forming alloys with lithium, the 4B group main group elements are preferably employed and Si or Sn are more preferably used. There are exemplified compounds represented by a chemical formula $N_xN'_ySi$ (here, N and N' in the formula respectively designate one or more metal elements except Si or Sn. Further, x and y are numeric values larger than 0.), such as $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_z$ $NbSi_2$, $TaSi_2$, $VSi_2$, $WSi_2$, $ZnSi$, etc. As the metallic materials used in the present invention, a plurality of kinds of metals may be combined together. There are used mixtures of metals capable of electrochemically reacting with lithium in the nonaqueous electrolyte and metals which do not electrochemically react with lithium in the nonaqueous electrolyte and specifically mixtures of metals capable of electrochemically forming alloys with lithium and metals which do not electrochemically form alloys with lithium.

As the carbon materials included in the composite particles, various kinds of carbon materials which can ensure an electronic conductivity even in the minute composite particles can be suitably selected. For instance, as the carbon materials, there may be used non-graphitizable carbon, graphitizable carbon, graphite, carbon black, etc. As the forms of the carbon materials, a fibrous material, a spherical material, a granular material, a scale material, etc. can be employed. As the carbon materials, a plurality of carbon materials may be mixed and the mixture may be use.

For instance, in order to obtain a higher electronic conductivity, a high crystalline graphite is preferably used as the carbon material includes in the composite particles. Further, when it is desired to suppress the expansion and contraction of the composite particles due to an electrochemical reaction, the non-graphitizable carbon is preferably employed as the carbon material included in the composite particles. When it is desired to suppress the structural destruction of the composite particles, that is, to suppress the minute particle, the fibrous carbon material is preferably used as the carbon material included in the composite particles. Further, when it is desired to improve a dispersibility in the anode, the carbon black is preferably employed as the carbon material included in the composite particles. When the filling characteristics of the carbon material in the composite particles are desirably improved, the granular carbon material or the spherical carbon material is preferably employed as the carbon material included in the composite particles. Further, in order to obtain the effects of the above-described combinations, two or more kinds of carbon materials may be mixed as the carbon materials included in the composite particles and the mixture may be preferably employed.

When the non-graphitizable carbon, the graphitizable carbon, the graphite, the carbon black, etc. are used as the carbon materials, the content of the carbon materials included in the composite particles is preferably located within a range showing a higher capacity than that of an anode using a usual carbonaceous material in view of achieving a high capacity. The specific content of the non-graphitizable carbon, the graphitizable carbon, the graphite, the carbon black, etc. is preferably located within a range to 0.3 wt % to 90 wt % relative to the metallic material including the metal capable of electrochemically reacting with lithium, more preferably located within a range of 0.5 wt % to 80 wt %, and especially preferably located within a range of 1 wt % to 70 wt %. When the content of the carbon materials is lower than the above-described range, there is a fear that the electronic conductivity may not be possibly maintained in the minute composite particles. Further, when the content of the carbon materials exceeds the above-described range, there exists a fear that an effect of improving a capacity may be more insufficient than that of the anode using the usual carbonaceous anode material.

As the carbon materials included in the composite particles, metallic carbide compounds can be used. The metallic carbide compounds are included in the composite particles, so that various of kinds of effects can be obtained as well as the improvement effect of the electronic conductivity like the above-described non-graphitizable carbon, graphitizable carbon, graphite, carbon black, etc. Specifically, when the compatibility of the metallic carbide compound and the metal capable of electrochemically reacting with lithium is high, the metallic carbide compound can stabilize the composition of the metal capable of electrochemically reacting with lithium. Further, the metallic carbide compound shows a thermal shock buffer effect in a pelletizing step of the composite particles to contribute to the stabilization of the structures of the composite particles.

As the specific metallic carbide compounds, there are enumerated SiC, $B_4C$, WC, $W_2C$, TiC, ZrC, HfC, VC, NbC, TaC, MoC, $V_2C$, $Ta_2C$, $Mo_2C$, $Mn_3C$, $Fe_3C$, $Co_3C$, $Ni_3C$, etc. These metallic carbide compounds may be independently used, or two or more kinds of them may be mixed and the mixture may be used depending on purposes. The metallic carbide compounds may be mixed with the above-described non-graphitizable carbon, graphitizable carbon, graphite, carbon black, etc. and the mixture may be used. Especially, the mixture of the metallic carbide compounds and the non-graphitizable carbon, the graphitizable carbon, the graphite, the carbon black, etc. as the carbon materials is included in the composite particles, so that the composite particles having more excellent characteristics are obtained by the synergistic effect thereof.

The metallic carbide compound hardly has a charging and discharging capacity by itself. Therefore, the composite particles containing the metallic carbide compound shows a capacity in a total of the anode materials lower than that when the above-described non-graphitizable carbon, graphitizable carbon, graphite, carbon black, etc. are included in the composite particles. Accordingly, the content of the metallic carbide compound included in the composite particles is preferably suitably adjusted. The specific content of the metallic carbide compound is preferably located within a range of 1 w % to 85 wt % relative to the metallic material including the metal capable of electrochemically reacting with lithium, more preferably located within a range of 5 wt % to 60 wt %, and especially preferably located within a range of 10 wt % to 50 wt %. When the content of the metallic carbide compound is lower than the above-described range, there exists a fear that the electronic conductivity may not be possibly ensured in the minute composite particles. Further, when the content of the carbon material exceeds the above-described range, there exists a fear that the improvement effect of a capacity may be possibly more insufficient than that of an anode using a usual carbonaceous anode material.

The anode according to the present invention preferably includes carbon powder as well as the composite particles having the carbon material contained in the above-described metallic material. In this case, the carbon powder is different from the carbon material included in the composite particles, provided between a plurality of composite particles and serves as a conductive agent or an anode material. The anode includes the carbon powder as well as the composite particles, so that the electronic conductivity between the composite particles or the composite particles and, for instance, a current collector can be more improved.

The amount of mixing of the carbon powder relative to the composite particles in the anode is preferably located within a range showing a higher capacity than that of an anode using a usual carbonaceous anode materials in view of achieving a high capacity. The specific amount of mixing of the carbon powder is preferably located within a range of 1 wt % to 95 wt % relative to the composite particles. When the amount of mixing of the carbon powder is lower than 1 wt %, there exists a fear that the electronic conductivity of the composite particles or the composite particles and, for instance, the current collector may be possibly deteriorated. Further, when the amount of mixing of the carbon powder exceeds 95 wt %, the content of the composite particles in the anode is relatively decreased, and accordingly, an effect of improving a capacity may be insufficient.

As the carbon powder to be mixed with the composite particles, the carbon powder may be the same as or different from the carbon material included in the composite particles as described above. As the specific types of the carbon powder, there may be exemplified, non-graphitizable carbon, graphitizable carbon, graphite, carbon black, etc. In order to obtain desired battery characteristics, a plurality of kinds of carbon powder may be mixed and the mixture may be used.

As the forms of the carbon powder, there may be used the powder of fibrous, spherical, granular, scale forms, etc. Further, a plurality of kinds of forms of powder may be mixed and the mixture may be used.

In the anode, a well-known binding agent and a current collector, etc. can be used as well as the above-described materials.

Since the above-described anode includes the composite particles having the metal capable of electrochemically reacting with lithium, the anode can realize a nonaqueous electrolyte secondary battery having a high capacity.

Since the carbon material is contained in the composite particles in the anode, even when the composite particles are caused to be minute, the carbon material is interposed between the minute composite particles to ensure the electronic conductivity in the composite particles. Consequently, even when charging and discharging operations are repeated, the rise of internal resistance in the battery due to the deterioration of electrodes can be suppressed. Accordingly, when this anode is used for the nonaqueous electrolyte battery, the anode suppresses the rise of the internal resistance in the battery due to the deterioration of electrodes and realizes excellent cyclic characteristics.

Now, a method for manufacturing the above-described anode will be described below.

When the composite particles included in the anode are produced, there is provided a step of including the carbon material in the metallic material, that is, a step of mixing the metallic material with the carbon material and pelletizing the mixture. At least a part of the step is carried out in a non-oxidizing atmosphere. Thus, in the production step of the composite particles, the oxidation or combustion of the carbon materials is prevented. In other words, the carbon material included in the composite particles is prevented from deteriorating its electronic conductivity in the production step. Accordingly, can be produced the composite particles which can ensure the electronic conductivity, because the carbon material is interposed between the minute composite particles even when the composite particles are caused to be minute by an electrochemical reaction.

When all the steps of mixing the metallic material with the carbon material and pelletizing the mixture is carried out in an oxidizing atmosphere such as air, the carbon material is oxidized or burnt. As a result, the manufactured composite particles insufficiently effectively ensure the electronic conductivity when the composite particles are caused to be minute.

As the above-described non-oxidizing atmosphere, there may be exemplified a vacuum atmosphere, a reducing atmosphere, an inert atmosphere, etc. More specifically, there may be exemplified a gas atmosphere such as $N_2$, Ar, He, $H_2$, Co, etc. and a plurality of kinds of them may be mixed and the mixture may be used.

As a method for obtaining the composite particles by mixing the metallic material with the carbon material and pelletizing the mixture, for instance, such a method as described below is preferably employed from an industrial point of view.

Initially, the metallic material including the metal capable of electrochemically reacting with lithium is heated to be molten. Then, the carbon material is mixed with the molten metallic material and dispersed. Then, the mixture of the molten metallic material and the carbon material is atomized to obtain atomized powder. After that, the atomized powder is classified by using a desired mesh, so that the composite particles having the carbon material included in the metallic material can be obtained.

In this method, a process for mixing the carbon material with the molten metallic material and dispersing the mixture is preferably carried out in a non-oxidizing atmosphere. Since the temperature of the molten metallic material is high, the metallic material can be mixed with the carbon material to prevent the carbon material from being oxidized or burnt. Further, an atmosphere in which the mixture of the metallic material and the carbon material is atomized is preferably a non-oxidizing atmosphere.

As a method for mixing the carbon material with the molten metallic material and dispersing the mixture, any of a method for mechanically agitating the mixture, a method using a self-agitating action such as an induction heating, etc. may be employed.

As described above, not only the method for mixing the carbon material with the molten metallic material, but also the metallic material may be mixed with the carbon material under a dry state before the metallic material is molten. In this case, before a heating process, the ambient atmosphere of the mixture of the metallic material and the carbon material may be replaced by a vacuum atmosphere or a non-oxidizing atmosphere.

As another method for obtaining the composite particles by mixing the carbon material with the metallic material and pelletizing the mixture, there may be exemplified a ball mill method, a mechanical alloying method, etc. In any case, a step in which the carbon material may be possibly oxidized or burnt is carried out in a non-oxidizing atmosphere.

As a time and a method for adding the metallic carbide compound when the metallic carbide compound is used as the carbon material, there may be exemplified, for instance, there is exemplified a method for adding the metallic carbide compound when the metal capable of electrochemically reacting with lithium is molten. There may be employed a method or the like that carbon and metal as component materials of the metallic carbide compound are respectively added to the molten metal capable of electrochemically reacting with lithium and the molten metal capable of electrochemically reacting with lithium is heated up to temperature at which the molten metal and the added carbon and metal form the metallic carbide compound.

According to the method for manufacturing the anode as mentioned above, the step of mixing the metallic material including the metal capable of electrochemically reacting with lithium with the carbon material and forming pellets from the mixture is carried out in the non-oxidizing atmosphere. Thus, there is no fear that the carbon material is oxidized or burnt. Therefore, even when the composite particles are caused to be minute, the carbon material is interposed between the minute composite particles so that the composite particles capable of ensuring the electronic conductivity can be obtained. Accordingly, according to the present invention, the anode which realizes a nonaqueous electrolyte secondary battery having a high capacity and excellent cyclic characteristics can be manufactured.

Now, a nonaqueous electrolyte secondary battery as one example of the nonaqueous electrolyte secondary battery using the above-described anode will be described below.

A nonaqueous electrolyte secondary battery to which the present invention is applied is shown in FIG. 1. This nonaqueous electrolyte secondary battery is, what is called, a cylindrical type. As shown in FIG. 1, in a substantially hollow cylindrical battery can 1, is provided a spirally coiled electrode element formed by laminating an elongated cathode 2 having a cathode material and an elongated anode 3 having an anode material through a separator 4, and coiling the laminated body many times and fixing the final end part of the separator 4 as an outermost periphery by an adhesive tape 5. The separator 4 is impregnated with, for instance, nonaqueous electrolyte solution as a nonaqueous electrolyte.

To the opened end part of the battery can 1, a battery cover 6 and a safety valve device 7 provided inside the battery cover 6 are attached by caulking through a gasket 8 to seal the battery can 1. The battery cover 6 is made of the same material as that of, for instance, the battery can 1. Further, in the battery can 1, a pair of insulating plates 9 and 10 are respectively provided perpendicularly to the peripheral surface so as to sandwich the spirally coiled electrode element in there between. The safety valve device 7 is provided with, what is called a current cutting-off mechanism which is electrically connected to the battery cover 6 and cuts off the electrical connection between the battery cover 6 and the spirally coiled electrode element when the internal pressure of the battery becomes a prescribed value or higher due to an internal short circuit or an external heating.

To the cathode 2, a cathode lead 11 made of aluminum or the like is connected. The cathode lead 11 is welded to the safety valve device 7 to be electrically connected to the battery cover 6. To the anode 3, an anode lead 12 made of nickel or the like is connected. The anode lead 12 is welded to the battery can 1 to be electrically connected thereto.

As the positive material used for the cathode 2, metallic oxides, metallic sulfides, specific polymers, etc. can be used depending on kinds of desired batteries. As the specific cathode materials, there may be exemplified, metallic sulfides or metallic oxides including no lithium such as $TiS_2$, $MoS_2$, $NbSe_2$, $V_2O_5$, etc., lithium composite oxides including a main component represented by a general formula $Li_xMo_2$ (here, M designates one or more kinds of transition metals, x is different depending on the charging and discharging states of a battery and ordinarily located within a range expressed by $0.05 \leq x \leq 1.10$).

The transition metals M forming the lithium composite oxide preferably include Co, Ni, Mn, etc. As the specific lithium composite oxides, there may be exemplified $LiCoO_2$, $LiNiO_2$, $Li_xNi_yCo_{1-y}O2$ (here, x and y are different depending on the charging and discharging states of a battery and ordinarily located within ranges expressed by $0<x<1$ and $0.7<y<1.02$.), lithium manganese oxides having spinel type structures, etc. Such lithium composite oxides can generate high voltage and are excellent in energy density.

For the cathode 2, a plurality of kinds of the above-described positive materials may be mixed together and the mixture may be used. When the cathode 2 is formed by using the above-described positive materials, a well-known conductive agent or a binding agent may be added thereto.

The anode 3 includes the above-described composite particles having the carbon material contained in the metallic material and metal capable of electrochemically reacting with lithium in a nonaqueous electrolyte as the metallic material. Since the anode 3 has the above-described composite particles, a nonaqueous electrolyte secondary battery having a higher capacity than that using a usual carbonaceous anode material can be realized.

Since the carbon material is included in the composite particles, even when the composite particles are caused to be minute, the carbon material included in the composite particles is interposed between the minute composite particles to ensure the electronic conductivity in the composite particles. Accordingly, there can be realized a nonaqueous electrolyte secondary battery in which even when charging and discharging reactions are repeated, the rise of internal resistance in the battery due to the deterioration of electrodes can be suppressed and excellent cyclic characteristics can be achieved.

The anode 3 may be electrochemically doped with lithium in the battery after the battery is manufactured, or lithium may be electrochemically supplied to the anode from the cathode 2 or a lithium source except the cathode 2 after or before the battery is manufactured. The anode may be doped with lithium by synthesizing a material including lithium upon synthesizing the material or including lithium in the anode 3 upon manufacturing the battery.

As the nonaqueous electrolyte, there may be used, for instance, nonaqueous electrolyte solution formed by dissolving electrolyte salt in a nonaqueous electrolyte solvent.

As the nonaqueous electrolyte solvent used for preparing the nonaqueous electrolyte solution, any of solvents used in such nonaqueous electrolyte secondary batteries may be employed. There are exemplified, for instance, propionic carbonate, ethylene carbonate, diethyl carbonate, dimethyl carbonate, 1,2-dimethoxyethane, 1,2-diethoxyethane, γ-butyrolactone, tetrahydrofuran, 2-methylhydrofuran, 1-3-dioxolane, 4-methyl-1,3-dixolane, diethyl ether, sulfolane, methyl sulfolane, acetonitrile, propiononitrile, anisole, acetic ester, butyric ester, propionic ester, etc.

As the electrolyte salts, any of salts used for such nonaqueous electrolyte secondary batteries may be employed. There are exemplified, for instance, $LiClO_4$, $LiAsF_6$, $LiPF_6$, $LiBF_4$, $LiB(C_6H_5)_4$, $CH_3SO_3Li$, $CF_3SO_3Li$, LiCl, LiBr, etc.

In the above-described nonaqueous electrolyte secondary battery, the anode 3 includes the composite particles which have the carbon material contained in the metallic material including metal capable of electrochemically reacting with lithium. Therefore, in the nonaqueous electrolyte secondary battery to which the present invention is applied, a high capacity is achieved as compared with a battery using a conventional carbonaceous anode material. When the composite particles included in the anode 3 are caused to be minute due to expansion and contraction upon charging and discharging the battery, the carbon material is interposed between the minute particles so that the electronic conductivity in the composite particles can be ensured. Accordingly, in the nonaqueous electrolyte secondary battery to which the present invention is applied, the rise of internal resistance in the battery due to the deterioration of electrodes is suppressed and excellent cyclic characteristics are achieved.

As described above, the nonaqueous electrolyte secondary battery to which the present invention is applied can realize the high capacity and the excellent cyclic characteristics.

In the above description, although the nonaqueous electrolyte secondary battery using the nonaqueous electrolyte solution obtained by dissolving the electrolyte salt in the nonaqueous solvent as the nonaqueous electrolyte is mentioned as an example, the present invention is not limited thereto. The present invention may be applied to examples using, as the nonaqueous electrolyte, for instance, a solid electrolyte including electrolyte salt and a gel electrolyte obtained by impregnating an organic polymer with a nonaqueous solvent and electrolyte salt, etc.

As the specific examples of the solid electrolyte, either an inorganic solid electrolyte or a solid polymer electrolyte, which is a material having a lithium ion conductivity, can be employed. As the specific inorganic solid electrolytes, there may be exemplified, lithium nitride, lithium iodide, etc. The solid polymer electrolyte comprises electrolyte salt and a polymer compound for dissolving it. As the specific polymer compounds, ether polymers such as poly(ethylene oxide) or bridged materials thereof, poly(methacrylate) esters, acrylate, etc. are independently used or copolymerized or mixed in molecules and the copolymerized or mixed materials can be used.

As the organic polymers used for the gel electrolyte, various kinds of polymers absorbing a nonaqueous solvent to gel can be used. As the specific organic polymers, there can be used fluorinated polymers such as poly(vinylidene fluoride) or poly(vinylidene fluoride-co-hexafluoro propylene), ether polymers such as poly(ethylene oxide) or bridged materials thereof, poly(acrylonitrile), etc. Especially, fluorinated polymers are preferably used from the viewpoint of oxidation-reduction stability. The electrolyte salt is included in these organic polymers to obtain an ionic conductivity.

In the above explanation, although what is called a cylindrical nonaqueous electrolyte secondary battery is described as an example, the nonaqueous electrolyte secondary battery according to the present invention is not limited thereto and may have various kinds of forms. The nonaqueous electrolyte secondary battery according to the present invention may be formed in any of shapes of a prismatic type, a coin type, a button type, etc.

Lithium existing in the battery system of the nonaqueous electrolyte secondary battery according to the present invention does not need to be always supplied from the cathode 2 or the anode 3. The cathode 2 or the anode 3 may be electrochemically doped with lithium during the manufacturing step of electrodes or the battery.

EXAMPLES

Specific Examples to which the present invention is applied will be described on the basis of experimental results. The present invention is not limited to the following description.

Experiment 1

Sample 1

Firstly, an anode and negative material were manufactured as described below.

Initially, Si powder as metal capable of electrochemically reacting with lithium in a nonaqueous electrolyte was heated at 1500° C. and molten in an atmosphere of Ar.

Then, a carbon material of 0.1 wt % was added to Si in a molten state without changing the atmosphere and they were mixed for some time. As the carbon material, spherical graphite (trade name: MCMB 6-28 produced by Osaka Gas Chemicals Co., Ltd.) was used.

Then, the mixture was atomized to the atmosphere of Ar to obtain atomized powder.

Subsequently, the atomized powder was classified by 200 meshes and the classified product thus obtained was used as composite particles having the carbon material contained in a metallic material.

As a negative material, the composite particles and scale shaped graphite (trade name: KS-44 produced by Timcal Co., Ltd) were mixed in the weight ratio 50:50. Polyvinylidene fluoride of 8 parts by weight was added to this mixture of 100 parts by weight and n-methylpyrrolidone as a solvent was further added to the mixture to obtain anode composite mixture slurry. The anode composite mixture slurry was uniformly applied to both the surfaces of an elongated copper foil having the thickness of 15 m as an anode current collector and dried, and then, the anode current collector having the slurry applied and dried was compression-molded by a roll press machine to obtain an elongated anode.

Subsequently, a cathode was manufactured.

In order to obtain $LiCoO_2$ as a positive active material, lithium carbonate and cobalt carbonate were mixed in the ratio 0.5 mole:1 mole and the mixture was sintered in air at 900° C. for 5 hours.

Then, obtained $LiCoO_2$ of 91 parts by weight, graphite of 6 parts by weight as a conductive agent and polyvinylidene fluoride of 3 parts by weight as a binding agent were mixed together to obtain cathode composite mixture slurry. The cathode composite mixture slurry was applied to both the surfaces of an elongated aluminum foil having the thickness of 20 m as a cathode current collector and dried, and the then, the dried cathode current collector was compression-molded by a roll press machine to obtain an elongated cathode.

The anode and the cathode manufacture as described above were laminated through a separator made of a microporous polypropylene film having the thickness of 25 m, then stacked the anode, the separator, the cathode and the separator, respectively. The laminated body thus obtained was spirally coiled many times and the final end part of the separator as an outermost periphery was fixed by an adhesive tape to manufacture a spirally coiled electrode element.

The spirally coiled electrode element was accommodated in a battery can made of iron and plated with nickel. The battery can having diameter of 18 mm, height of 65 mm, inside diameter of 17.38 mm, and the thickness of 0.31 mm was used. A pair of insulating plates were disposed on both the upper and lower surfaces of the spirally coiled electrode element and a cathode lead made of aluminum was drawn from the cathode current collector and connected to a battery cover. Further, an anode lead made of nickel was drawn from the anode current collector and welded to the battery can.

Nonaqueous electrolyte solution obtained by dissolving $LiPF_6$ in the mixed solvent of ethylene carbonate and dimethyl carbonate of equal volume at the rate of 1 mole/1 was injected into the battery can.

Then, the battery can was caulked through a gasket having a surface to which asphalt was applied to fix the battery cover thereto and hold an air-tightness in the battery. A cylindrical nonaqueous electrolyte secondary battery was manufactured in such a manner as described above.

Sample 2

A nonaqueous electrolyte secondary battery was manufactured in the same manner as that of the Sample 1 except that the carbon material of 0.3 wt % was included in the composite particles.

Sample 3

A nonaqueous electrolyte secondary battery was manufactured in the same manner as that of the Sample 1 except that the carbon material of 0.5 wt % was included in the composite particles.

Sample 4

A nonaqueous electrolyte secondary battery was manufactured in the same manner as that of the Sample 1 except that the carbon material of 1.0 wt % was included in the composite particles.

Sample 5

A nonaqueous electrolyte secondary battery was manufactured in the same manner as that of the Sample 1 except that the carbon material of 3.0 wt % was included in the composite particles.

Sample 6

A nonaqueous electrolyte secondary battery was manufactured in the same manner as that of the Sample 1 except that the carbon material of 5.0 wt % was included in the composite particles.

Sample 7

A nonaqueous electrolyte secondary battery was manufactured in the same manner as that of the Sample 1 except that the carbon material of 10.0 wt % was included in the composite particles.

Sample 8

A nonaqueous electrolyte secondary battery was manufactured in the same manner as that of the Sample 1 except that the carbon material of 15.0 wt % was included in the composite particles.

Sample 9

A nonaqueous electrolyte secondary battery was manufactured in the same manner as that of the Sample 1 except that the carbon material of 20.0 wt % was included in the composite particles.

Sample 10

A nonaqueous electrolyte secondary battery was manufactured in the same manner as that of the Sample 1 except that the carbon material of 30.0 wt % was included in the composite particles.

Sample 11

A nonaqueous electrolyte secondary battery was manufactured in the same manner as that of the Sample 1 except that the carbon material of 50.0 wt % was included in the composite particles.

Sample 12

A nonaqueous electrolyte secondary battery was manufactured in the same manner as that of the Sample 1 except that the carbon material of 70.0 wt % was included in the composite particles.

Sample 13

A nonaqueous electrolyte secondary battery was manufactured in the same manner as that of the Sample 1 except that the carbon material of 90.0 wt % was included in the composite particles.

Sample 14

A nonaqueous electrolyte secondary battery was manufactured in the same manner as that of the Sample 1 except that metal capable of electrochemically reacting with lithium was not used and only spherical graphite (trade name: MCMB 6-28 produced by Osaka Gas Chemicals Co., Ltd.) was used.

Sample 15

A nonaqueous electrolyte secondary battery was manufactured in the same manner as that of the Sample 1 except that the carbon material was not included in metal capable of electrochemically reacting with lithium, that is, the composite particles were only composed of Si.

The cyclic maintaining/retention ratios of the Samples 1 to 15 manufactured as described above were obtained. In order to measure the cyclic maintaining/retention ratio, charging and discharging cycles were repeated in which a constant-current and constant-voltage charging operation was carried out under the conditions of maximum voltage of 4.2 V, constant-current of 1 A and charging time for 5 hours and a discharging operation was carried out under constant-current of 1 A up to end voltage of 2.5 V. Assuming that the discharging capacity of a first cycle was 100, the discharging capacity of 50th cycle was represented by % as a cyclic maintaining/retention ratio.

The initial capacity of each of the Samples 1 to 15 was measured. Assuming that the initial capacity of the Sample 1 was 1, the ratio of the initial capacity of each of the Samples 2 to 15 was represented as an initial capacity ratio.

The initial capacity ratios and the cyclic maintaining/retention ratios of the Samples 1 to 15 are shown in Table 1 illustrated below and FIG. 2.

TABLE 1

|  | Contained Carbon Material (wt %) | Scale Shaped Graphite Conductive Agent (%) | Cyclic Maintaining/ retention Ratio (%) | Initial Capacity Ratio |
|---|---|---|---|---|
| Sample 1 | 0.1 | 50 | 11 | 1.00 |
| Sample 2 | 0.3 | 50 | 15 | 1.03 |
| Sample 3 | 0.5 | 50 | 32 | 1.05 |
| Sample 4 | 1.0 | 50 | 68 | 1.09 |
| Sample 5 | 3.0 | 50 | 81 | 1.11 |
| Sample 6 | 5.0 | 50 | 84 | 1.11 |
| Sample 7 | 10.0 | 50 | 90 | 1.10 |
| Sample 8 | 15.0 | 50 | 93 | 1.06 |
| Sample 9 | 20.0 | 50 | 94 | 1.02 |
| Sample 10 | 30.0 | 50 | 94 | 0.98 |
| Sample 11 | 50.0 | 50 | 90 | 0.91 |
| Sample 12 | 70.0 | 50 | 80 | 0.73 |
| Sample 13 | 90.0 | 50 | 70 | 0.45 |
| Sample 14 | 100.0 | 50 | 95 | 0.35 |
| Sample 15 | 0.0 | 50 | 9 | 0.99 |

Figure 2:
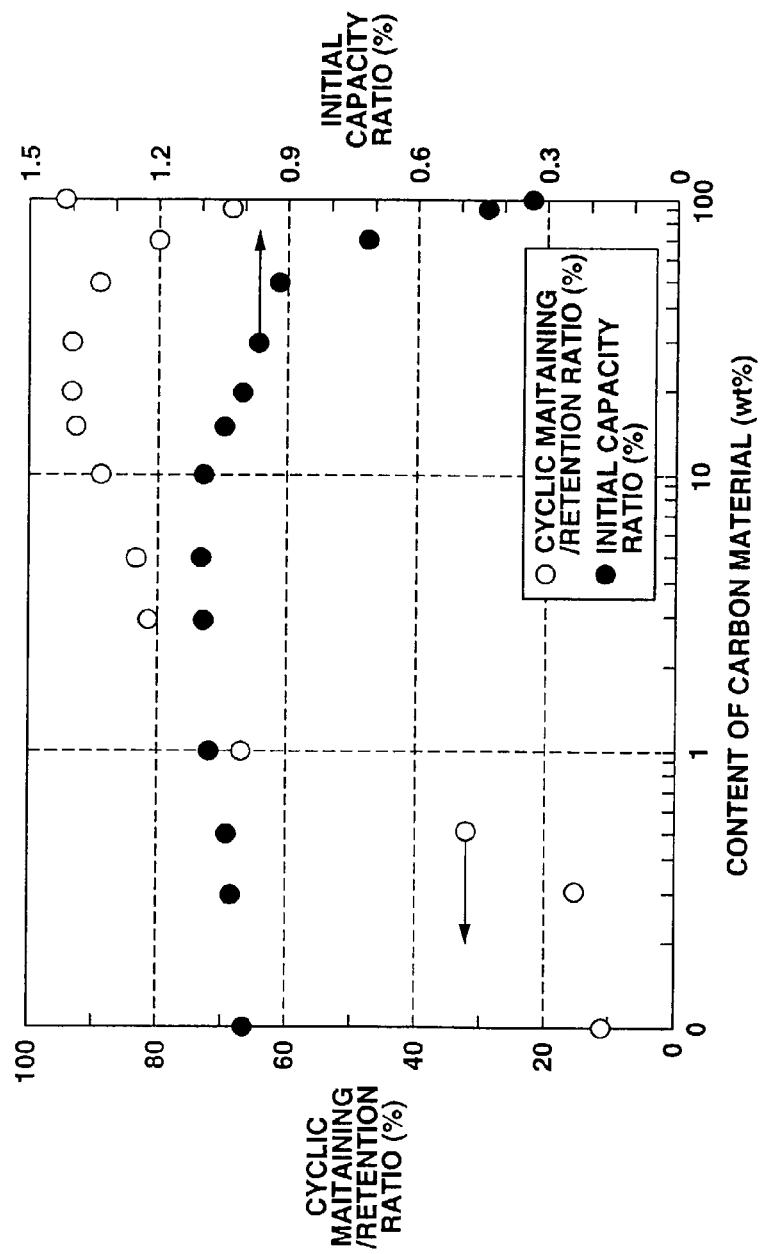
FIG. 2 is a characteristic view showing the relation between the content of a carbon material included in composite particles, the cyclic maintaining/retention ratio and the initial capacity ratio of the nonaqueous electrolyte secondary battery.

It was understood from the results of the Table 1 and FIG. 2 that the Samples 1 to 14 using the composite particles having the carbon material contained in the metallic material as the negative active material of the anode showed more excellent cyclic characteristics than that of the Sample 15 using the negative active material of the anode composed of only metal capable of electrochemically reacting with lithium.

The Sample 14 using the negative active material of the anode including no metal capable of electrochemically reacting with lithium and composed only of the carbon material showed an initial capacity lower than those of the Samples 1 to 13 using the composite particles including the metallic material.

It was apparent from the above-described results that the anode included the composite particles having the carbon material contained in the metallic material and metal capable of electrochemically reacting with lithium in the nonaqueous electrolyte solution was included as the metallic material so that the nonaqueous electrolyte secondary battery in which a high initial capacity was compatible with excellent cyclic characteristics could be realized.

Experiment 2

Sample 16

A nonaqueous electrolyte secondary battery was manufactured in the same manner as that of the Sample 1 except that acetylene black (produced by Denki Kagaku Kogyo K. K.) of 10 wt % was used as the carbon material contained in the composite particles. The acetylene black is an aggregate of several hundred nm to several thousand nm having fine particles of about several ten nm connected in a string of beads.

Sample 17

A nonaqueous electrolyte secondary battery was manufactured in the same manner as that of the Sample 1 except that scale type graphite (trade name: KS-6 produced by Timcal Co., Ltd.) of 10 wt % was used as the carbon material contained in the composite particles.

Sample 18

A nonaqueous electrolyte secondary battery was manufactured in the same manner as that of the Sample 1 except that fibrous graphite (trade name: VGCF produced by Showa Denko, K. K.) of 10 wt % was used as the carbon material contained in the composite particles.

Sample 19

A nonaqueous electrolyte secondary battery was manufactured in the same manner as that of the Sample 1 except that pitch-based non-graphitizable carbon (trade name: Carbotron P produced by Kureha Chemical Industry Co., Ltd.) of 10 wt % was used as the carbon material contained in the composite particles. The pitch-based non-graphitizable carbon has angular forms caused to be minute to have an average diameter of about several m to several ten m.

Sample 20

A nonaqueous electrolyte secondary battery was manufactured in the same manner as that of the Sample 1 except that the mixture of scale type graphite (trade name: KS-6 produced by Timcal Co., Ltd.) and fibrous graphite (trade name: KS-6 produced by Timcal Co., Ltd.) of 10 wt % having equal volume was used as the carbon material contained in the composite particles.

The initial capacity ratios and the cyclic maintaining/retention ratios of the Samples 16 to 20 manufactured as mentioned above were obtained in the same manner as that of the above Experiment 1. The results of the initial capacity ratios and the cyclic maintaining/retention ratios of the Samples 16 to 20 are shown in Table 2 together with the results of the Sample 7.

TABLE 2

|  | Contained Carbon Material (wt %) | Scale Shaped Graphite Conductive Agent (%) | Cyclic Maintaining/ retention Ratio (%) | Initial Capacity Ratio |
|---|---|---|---|---|
| Sample 7 | 10.0 | 50 | 90 | 1.10 |
| Sample 16 | 10.0 | 50 | 91 | 1.05 |
| Sample 17 | 10.0 | 50 | 92 | 1.07 |
| Sample 18 | 10.0 | 50 | 93 | 1.08 |
| Sample 19 | 10.0 | 50 | 94 | 1.04 |
| Sample 20 | 10.0 | 50 | 93 | 1.09 |

As apparent from the Table 2, when any kind of materials of acetylene black, graphite and non-graphitizable carbon was used as the carbon material contained in the composite particles, the nonaqueous electrolyte secondary battery having a high capacity and excellent cyclic characteristics could be realized.

Further, it was understood that any of a spherical form, a scale form and a fibrous form could be used as the form of the carbon material contained in the composite particles and a plurality of kinds of them could be mixed and used.

Experiment 3

Sample 21

Initially, Si powder of 20 parts by weight as metal capable of electrochemically reacting with lithium was mixed with Cu powder of 80 parts by weight as metal which did not electrochemically react with lithium and the mixture was heated at 1000° C. and molten in an atmosphere of Ar.

Then, a carbon material of 0.1 wt % was added to the mixture of Si and Cu in a molten state without changing the atmosphere and they were mixed for some time. As the carbon material, spherical graphite (trade name: MCMB 6-28 produced by Osaka Gas Chemicals Co., Ltd.) was used.

Then, the mixture was atomized to the atmosphere of Ar to obtain atomized powder.

Subsequently, the atomized powder was classified by 200 meshes and the classified product thus obtained was used as composite particles.

A nonaqueous electrolyte secondary battery was manufacture in the same manner as that of the Sample 1 except that the composite particles obtained as described above were used as the anode material.

The initial capacity ratio and the cyclic maintaining/retention ratio of the Sample 21 manufactured as mentioned above were obtained in a similar manner to that of the above Experiment 1. The results of the initial capacity ratio and the cyclic maintaining/retention ratio of the Sample 21 are shown in Table 3 as well as the results of the Sample 10.

TABLE 3

|  | Contained Carbon Material (wt %) | Scale Shaped Graphite Conductive Agent (%) | Cyclic Maintaining/ retention Ratio (%) | Initial Capacity Ratio |
|---|---|---|---|---|
| Sample 10 | 30.0 | 50 | 94 | 0.98 |
| Sample 21 | 30.0 | 50 | 95 | 0.98 |

As apparent from the Table 3, even when the metallic material forming the composite particles was composed of the mixture of the metal capable of electrochemically reacting with lithium and the metal incapable of electrochemically reacting with lithium, a nonaqueous electrolyte secondary battery having a high capacity and excellent in its cyclic characteristics could be realized.

Experiment 4

Sample 22

Composite particles were produced in the same manner as that of the Sample 8. The composite particles and scale type graphite (trade name: KS-44 produced by Timcal Co., Ltd.) were mixed in the weight ratio 95:5. A nonaqueous electrolyte secondary battery was manufactured in the same manner as that of the Sample 8 except that an anode was manufactured by using the mixture.

Sample 23

Composite particles were produced in the same manner as that of the Sample 8. The composite particles and scale type graphite (trade name: KS-44 produced by Timcal Co., Ltd.) were mixed in the weight ratio 85:15. A nonaqueous electrolyte secondary battery was manufactured in the same manner as the Sample 8 except that an anode was manufactured by using the mixture.

Sample 24

Composite particles were produced in the same manner as that of the Sample 8. The composite particles and scale type graphite (trade name: KS-44 produced by Timcal Co., Ltd.) were mixed in the weight ratio 65:35. A nonaqueous electrolyte secondary battery was manufactured in the same manner as that of the Sample 8 except that an anode was manufactured by using the mixture.

Sample 25

Composite particles were produced in the same manner as that of the Sample 8. The composite particles and scale type graphite (trade name: KS-44 produced by Timcal Co., Ltd.) were mixed in the weight ratio 25:75. A nonaqueous electrolyte secondary battery was manufactured in the same manner as the Sample 8 except that an anode was manufactured by using the mixture.

Sample 26

Composite particles were produced in the same manner as that of the Sample 8. The composite particles and scale type graphite (trade name: KS-44 produced by Timcal Co., Ltd.) were mixed in the weight ratio 5:95. A nonaqueous electrolyte secondary battery was manufactured in the same manner as that of the Sample 8 except that an anode was manufactured by using the mixture.

The initial capacity ratios and the cyclic maintaining/retention ratios of the Samples 22 to 26 manufactured as mentioned above were obtained in a similar manner to that of the above Experiment 1. The results of the initial capacity ratios and the cyclic maintaining/retention ratios of the Samples 22 to 26 are shown in Table 4 as well as the results of the Sample 8.

TABLE 4

|  | Contained Carbon Material (wt %) | Scale Shaped Graphite Conductive Agent (%) | Cyclic Maintaining/ retention Ratio (%) | Initial Capacity Ratio |
|---|---|---|---|---|
| Sample 22 | 15.0 | 5 | 75 | 1.33 |
| Sample 23 | 15.0 | 15 | 81 | 1.22 |
| Sample 24 | 15.0 | 35 | 94 | 1.15 |
| Sample 8 | 15.0 | 50 | 93 | 1.06 |
| Sample 25 | 15.0 | 75 | 94 | 0.88 |
| Sample 26 | 15.0 | 95 | 94 | 0.45 |

As apparent from the Table 4, when the anode had the carbon powder as well as the composite particles, the nonaqueous electrolyte secondary battery having a high capacity and excellent cyclic characteristics could be realized under various kinds of mixture ratios.

Experiment 5

Sample 27

A nonaqueous electrolyte secondary battery was manufactured in the same manner as that of the Sample 10 except that a carbon material was added to Si in a molten state under the atmosphere of air and they were mixed for some time, when composite particles were produced.

The initial capacity ratio and the cyclic maintaining/retention ratio of the Sample 27 manufactured as mentioned above were obtained in a similar manner to that of the above Experiment 1. The results of the initial capacity ratio and the cyclic maintaining/retention ratio of the Sample 27 are shown in Table 5 as well as the results of the Sample 10.

TABLE 5

|  | Contained Carbon Material (wt %) | Scale Shaped Graphite Conductive Agent (%) | Cyclic Maintaining/ retention Ratio (%) | Initial Capacity Ratio |
|---|---|---|---|---|
| Sample 10 | 30.0 | 50 | 94 | 0.98 |
| Sample 27 | 30.0 | 50 | 92 | 0.98 |

It was understood from the results of the Table 5 that the Sample 10 in which the carbon material was mixed with the metal capable of electrochemically reacting with lithium in a molten state under a non-oxidizing atmosphere showed a higher capacity and a more excellent cyclic maintaining/retention ratio than those of the Sample 27 in which the carbon material was mixed with the metal capable of electrochemically reacting with lithium in air.

As apparent from the above-described results, at least a part of a step of mixing the carbon material with metal capable of electrochemically reacting with lithium and pelletizing the mixture was carried out under the non-oxidizing atmosphere so that the composite particles could be manufactured without oxidizing or sintering the carbon material and a nonaqueous electrolyte secondary battery having more excellent characteristics could be manufactured.

Experiment 6

Sample 28

A nonaqueous electrolyte secondary battery was manufactured in the same manner as that of the Sample 7 except that composite particles were produced by further adding metallic carbide compound (SiC) of 1 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 29

A nonaqueous electrolyte secondary battery was manufactured in the same manner as that of the Sample 7 except that composite particles were produced by further adding metallic carbide compound (SiC) of 3 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 30

A nonaqueous electrolyte secondary battery was manufactured in the same manner as that of the Sample 7 except that composite particles were produced by further adding metallic carbide compound (SiC) of 5 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 31

A nonaqueous electrolyte secondary battery was manufactured in the same manner as that of the Sample 7 except that composite particles were produced by further adding metallic carbide compound (SiC) of 10 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 32

A nonaqueous electrolyte secondary battery was manufactured in the same manner as that of the Sample 7 except that composite particles were produced by further adding metallic carbide compound (SiC) of 20 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 33

A nonaqueous electrolyte secondary battery was manufactured in the same manner as that of the Sample 7 except that composite particles were produced by further adding metallic carbide compound (SiC) of 40 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 34

A nonaqueous electrolyte secondary battery was manufactured in the same manner as that of the Sample 7 except that composite particles were produced by further adding metallic carbide compound (SiC) of 70 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 35

A nonaqueous electrolyte secondary battery was manufactured in the same manner as that of the Sample 7 except that composite particles were produced by further adding metallic carbide compound (SiC) of 90 wt % as a carbon material to Si in a molten state. Spherical graphite (trade name: MCMB 6-28 produced by Osaka Gas Chemicals Co., Ltd.) and the metallic carbide compound (SiC) as the carbon materials were added to Si in the molten state at the same time.

Sample 36

A nonaqueous electrolyte secondary battery was manufactured in the same manner as that of the Sample 1 except that composite particles were produced by adding only metallic carbide compound (SiC) of 40 wt % as a carbon material to Si in a molten state.

The initial capacity ratios and the cyclic maintaining/retention ratios of the Samples 28 to 36 manufactured as mentioned above were obtained in a similar manner to that of the above Experiment 1. The results of the initial capacity ratios and the cyclic maintaining/retention ratios of the Samples 28 to 36 are shown in Table 6.

TABLE 6

| | Composite Particle | | |
|---|---|---|---|
| | Metal Capable of Electrochemically Reacting with Lithium (wt %) | Contained Carbon Material | |
| | | Metallic Carbide Compound (SiC) (wt %) | Acetylene Black (wt %) |
| Sample 28 | 90 | 1 | 10 |
| Sample 29 | 90 | 3 | 10 |
| Sample 30 | 90 | 5 | 10 |
| Sample 31 | 90 | 10 | 10 |
| Sample 32 | 90 | 20 | 10 |
| Sample 33 | 90 | 40 | 10 |
| Sample 34 | 90 | 70 | 10 |
| Sample 35 | 90 | 90 | 10 |
| Sample 36 | 100 | 40 | — |

TABLE 6-continued

| | Scale Shaped Graphite Conductive Agent (%) | Cyclic Maintaining/ retention Ratio (%) |
|---|---|---|
| Sample 28 | 50 | 90 |
| Sample 29 | 50 | 91 |
| Sample 30 | 50 | 93 |
| Sample 31 | 50 | 94 |
| Sample 32 | 50 | 94 |
| Sample 33 | 50 | 93 |
| Sample 34 | 50 | 92 |
| Sample 35 | 50 | 90 |
| Sample 36 | 50 | 92 |

As apparent from the results of the Sample 36 in the Table 6, the nonaqueous electrolyte secondary battery excellent in its cyclic characteristics could be realized by using the metallic carbide compound as the carbon material to be contained in the composite particles.

Further, as apparent from the results of the Samples 28 to 35, the mixture of materials such as the metallic carbide compound and acetylene black could be used as the carbon material to be contained in the composite particles.

INDUSTRIAL APPLICABILITY

Since composite particles include metal capable of electrochemically reacting with lithium in a nonaqueous electrolyte as a metallic material, an anode according to the present invention can realize a high capacity. Further, the anode according to the present invention can ensure an electronic conductivity in the composite particles even when the composite particles are caused to be minute due to expansion and contraction upon electrochemical reaction, because a carbon material is contained in the composite particles so that the carbon material is interposed between the minute particles. Thus, according to the present invention, there can be provided the anode in which a high capacity is exhibited, the rise of internal resistance in a battery due to the deterioration of electrodes is suppressed and excellent characteristics are realized, when the anode is used for a nonaqueous electrolyte battery.

In a nonaqueous electrolyte secondary battery according to the present invention, an anode includes composite particles having a carbon material contained in a metallic material. Since the composite particles include metal capable of electrochemically reacting with lithium in nonaqueous electrolyte solution as the metallic material, the nonaqueous electrolyte secondary battery having a high capacity can be realized. Even when the composite particles are caused to be minute, since the carbon material is contained in the composite particles, the carbon material is interposed between the minute particles to ensure an electronic conductivity in the composite particles. As a result, even when charging and discharging operations are repeated, the rise of internal resistance in the battery due to the deterioration of electrodes is suppressed. Accordingly, according to the present invention, there can be provided the nonaqueous electrolyte secondary battery in which a high capacity is shown, the rise of internal resistance in the battery due to the deterioration of electrodes is suppressed and excellent cyclic characteristics are realized.

In a method for manufacturing an anode according to the present invention, when composite particles are produced, at least a part of a step of mixing a metallic material including metal capable of electrochemically reacting with lithium in a nonaqueous electrolyte with a carbon material and pelletizing the mixture is carried out in a non-oxidizing atmosphere. Thus, the carbon material is prevented from being oxidized or burnt. Therefore, according to the present invention, can be manufactured the anode capable of realizing a nonaqueous electrolyte secondary battery having high capacity and excellent cyclic characteristics.

The invention claimed is:

1. A nonaqueous electrolyte secondary battery comprising:
an anode;
a cathode; and
a nonaqueous electrolyte,
wherein,
the anode comprises a negative electrode active material disposed on a surface of a current collector, said active material including a first material composed of a carbon powder and a second material composed of a composite particle,
the carbon powder is comprised of a first carbon material,
the composite particle includes a mixture of (a) a metallic material metal and (b) a second carbon material,
the second carbon material comprises particles of (a) non-graphitizable carbon, graphitizable carbon, graphite, or carbon black, and (b) at least one metallic carbide compound selected from the group consisting of SiC, WC, $W_2C$, TiC, ZrC, HfC, VC, NbC, TaC, MoC, $V_2C$, $Ta_2C$, $Mo_2C$, $Mn_3C$, $Fe_3C$, $Co_3C$, and $Ni_3C$,
the metallic material of the second material includes silicon, tin, or both,
the metallic material metal is not a metallic carbide compound and includes a metal capable of electrochemically reacting with lithium,
the first carbon material and the second carbon material are the same or different, and
the second carbon material of the second material is at least partially embedded within the composite particle of the second material.

2. The nonaqueous electrolyte secondary battery according to claim 1, wherein the metallic material comprises a mixture of a metal capable of electrochemically reacting with lithium in the nonaqueous electrolyte and metal which does not electrochemically react with lithium in the nonaqueous electrolyte.

3. The nonaqueous electrolyte secondary battery according to claim 1, wherein the first carbon material of the carbon powder is selected from the group consisting of non-graphitizable carbon, graphitizable carbon, graphite, carbon black, and mixtures thereof.

4. The nonaqueous electrolyte secondary battery according to claim 1, wherein the second carbon material of the second material further has a form selected from the group consisting of spherical forms, granular forms, scale forms, and mixtures thereof.

5. The nonaqueous electrolyte secondary battery according to claim 1, wherein the second carbon material and the metallic carbide compound of the second material are at least partially embedded within the composite particle of the second material.

6. The nonaqueous electrolyte secondary battery according to claim 1, wherein the second carbon material of the second material in the composite particle has fiber form.

7. The nonaqueous electrolyte secondary battery according to claim 1, wherein the second carbon material of the second material is present in an amount that is within the range of 0.3 wt % to 90 wt %, both inclusive, relative to the metallic material.

8. The nonaqueous electrolyte secondary battery according to claim 1, wherein the second carbon material of the second material is present in an amount that is within the range of 1 wt % to 70 wt %, both inclusive, relative to the metallic material.

9. The nonaqueous electrolyte secondary battery according to claim 1, wherein the second carbon material of the second material is different from the first carbon material.

10. The nonaqueous electrolyte secondary battery according to claim 1, wherein the cathode comprises lithium composite oxide represented by a general formula $Li_xMO_2$, where M is one or more transition metals, and x is different depending on charging and discharging states of a battery and is within a range of from about $0.05 \leq x \leq 1.10$, both inclusive.

11. The nonaqueous electrolyte secondary battery according to claim 1, wherein the nonaqueous electrolyte comprises ethylene carbonate and dimethyl carbonate.

12. The nonaqueous electrolyte secondary battery according to claim 11, wherein the nonaqueous electrolyte further comprises $LiPF_6$ and $LiBF_4$.

13. An anode active material comprising a composite particle including a mixture of:
(a) a metallic material;
(b) a carbon material; and
(c) at least one metallic carbide compound selected from the group consisting of SiC, WC, W2C, TiC, ZrC, HfC, VC, NbC, TaC, MoC, V2C, Ta2C, Mo2C, Mn3C, Fe3C, Co3C, and Ni3C,
wherein,
the carbon material is different from each metallic carbide compound,
the metallic material is not a metallic carbide compound and includes a metal capable of electrochemically reacting with lithium,
the metallic material of the second material includes silicon, tin or both, and
the carbon material is at least partially embedded within the metallic material.

14. The anode active material according to claim 13, wherein the metallic material comprises a mixture of a metal capable of electrochemically reacting with lithium in the nonaqueous electrolyte and metal which does not electrochemically react with lithium in the nonaqueous electrolyte.

15. The anode active material according to claim 13, wherein the carbon material is selected from the group consisting of non-graphitizable carbon, graphitizable carbon, graphite, carbon black, and mixtures thereof.

16. The anode active material according to claim 13, wherein the carbon material has a form selected from the group consisting of spherical forms, granular forms, scale forms, and mixtures thereof.

17. The anode active material according to claim 13, wherein the carbon material and the metallic carbide compound are at least partially embedded within the composite particle.

18. The anode active material according to claim 13, wherein the carbon material in the composite particle has fiber form.

19. The anode active material according to claim 13, wherein the carbon material is present in an amount that is within the range of 0.3 wt % to 90 wt %, both inclusive, relative to the metallic material.

20. The anode active material according to claim 13, wherein the carbon material of the second material is present in an amount that is within the range of 1wt % to 70 wt %, both inclusive, relative to the metallic material.

21. An anode active material comprising:
(a) a carbon powder comprising a first carbon material; and
(b) composite particles metal materials in which are embedded are second carbon material,
wherein,
the first carbon material and the second carbon material are the same or different,
the metallic material is not a metallic carbide compound and includes a metal capable of electrochemically reacting with lithium,
the second carbon material comprises (a) non-graphitizable carbon, graphitizable carbon, graphite, carbon black, or mixtures of them, and (b) at least one metallic carbide compound selected from the group consisting of SiC, WC, $W_2C$, TiC, ZrC, HfC, VC, NbC, TaC, MoC, $V_2C$, $Ta_2C$, $Mo_2C$, $Mn_3C$, $Fe_3C$, $Co_3C$, and $Ni_3C$,
for each composite particle, the second carbon material is embedded in the metallic material such that at least a portion of the carbon material is exposed from the composite particle another portion of the carbon material is buried in the composite particle,
the non-graphitizable carbon, graphitizable carbon, graphite, carbon black, or a mixture of them of the carbon material is present in an amount of 0.3 wt % to 90 wt % of the metallic material,
the metallic carbide compound is present in an amount of 1 wt % to 85 wt % of the metallic material,
the carbon powder is present in an amount of 1 wt % to 90 wt % of the composite particles, and
the metallic material includes a metal capable of electrochemically reacting with lithium.

22. The anode active material of claim 21, wherein the first carbon material consists of non-graphitizable carbon, graphitizable carbon, graphite, carbon black, or a mixture of them.

23. The anode active material of claim 21, wherein the non-graphitizable carbon, graphitizable carbon, graphite, carbon black, or a mixture of them have a fibrous form, a spherical form, granular form, scale form, or mixtures thereof.

* * * * *